United States Patent Office
3,801,568
Patented Apr. 2, 1974

3,801,568
OPTICALLY ACTIVE 1,3 - DIHYDRO - 3-SUBSTITUTED 5-PHENYL - 2H-1,4 - BENZODIAZEPIN-2-ONES AND PROCESS FOR THEIR SEPARATION
Abraham Nudelman, Bala Cynwyd, and Ronald J. McCaully, Malvern, Pa., assignors to American Home Products Corporation, New York, N.Y.
No Drawing. Filed Feb. 7, 1972, Ser. No. 224,262
Int. Cl. C07d 53/06
U.S. Cl. 260—239.3 D      5 Claims

ABSTRACT OF THE DISCLOSURE

The disclosure is directed to diastereomeric mixtures of 1,3-dihydro - 3 - substituted-5-phenyl-2H-1,4-benzodiazepin-2-ones and to the process for the separation of the diastereomers. The compounds of the invention have the structural formula

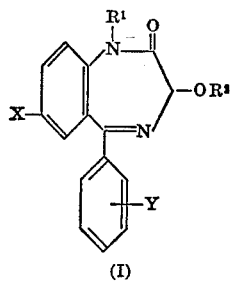

(I)

where X, Y, $R^1$ and $R^2$ are as defined below. The compounds have marked central nervous system depressant effects as well as muscle relaxant and antianxiety properties when evaluated in standard pharmacological procedures.

---

This invention relates to novel diastereomeric mixtures of 1,3 - dihydro - 3 - substituted-5-phenyl-2H-1,4-benzodiazepin-2-ones and to the process for the separation of these diastereomers. The chemical structure of these compounds may be schematically represented by

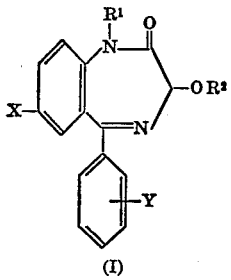

(I)

wherein X is selected from the group consisting of halogen, trifluoromethyl, nitro, cyano and lower alkyl thio;
Y is selected from the group consisting of hydrogen, halogen, trifluoromethyl, nitro, cyano and lower alkyl thio;
$R^1$ is hydrogen, lower alkyl, phen(lower)alkyl or lower alkoxy(lower)alkyl; and
$R^2$ is selected from the group of optically active radicals which contain a minimum of one asymmetric center consisting of aryl(lower)alkylcarbamoyl, lower alkoxyacyl, acyloxyacyl phenyl(acyloxy)acyl, and phenyl(lower)alkoxy acyl.

More specifically $R^2$ may be selected from the group of optically active radicals consisting of α-methylbenzylcarbamoyl, (p - menth - 3 - yloxy)acetyl, cholesteryloxyacetyl, O-methyllactyl, O-methylmandelyl, O-acetyllactyl and O-acetylmandelyl.

The terms "lower alkyl," "lower alkoxy(lower)alkyl," and the like, as used herein, refer to straight chain and branched groups having one to ten carbon atoms therein.

"Aryl(lower)alkyl" refers to phenyl and naphthyl groups attached lower alkyl radicals.

Specific embodiments of the invention are as follows:

7-chloro-5-(o-chlorophenyl)-1,3-dihydro-3-hydroxy-2H-1,4-benzodiazepin-2-one, (p-menth-3-yloxy)acetate.
7-chloro-5-(o-chlorophenyl)-1,3-dihydro-3-hydroxy-2H-1,4-benzodiazepin-2-one, mandelate, acetate.
7-chloro-5-(o-chlorophenyl)-1,3-dihydro-3-hydroxy-2H-1,4-benzodiazepin-2-one, α-methylbenzylcarbamate.
7-chloro-5-(o-chlorophenyl)-1,3-dihydro-3-hydroxy-2H-1,4-benzodiazepin-2-one, methoxyphenylacetate.

The preparation of these compounds may be represented schematically by the following equations.

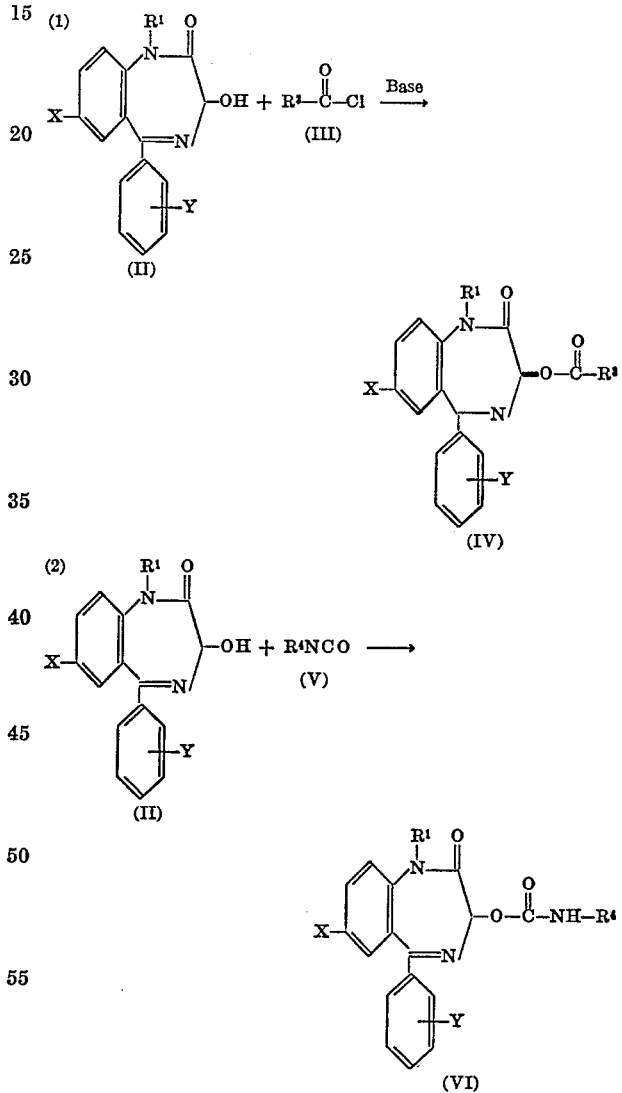

wherein $R^1$, X and Y are as described above;
$R^3$ and $R^4$ are optically active lower alkyl or ar(lower)alkyl groups which contain a minimum of one asymmetric center.

The closest known prior art is U.S. Pats. 3,109,843 which concerns 5-phenylbenzodiazepine derivatives, U.S. Pat. 3,420,817 which concerns 4,1,5-benzoxadiazocin-2-ones, U.S. Pat. 3,457,266 which concerns 1,2-dihydro-4-isoquinolones which are intermediates for 1,4-benzodiazepin-2(1H)-ones and their use as anticonvulsants, Belgium Pat. 717,478 which concerns benzodiazepine derivatives and their use as sedatives, hypnotics, muscle relaxants, and anticonvulsants, and South African Pat. 67/133 which concerns benzodiazepin - 2-ones, benzoxadiazocines and intermediates therefor.

The starting materials having the structural formula (II) 7-chloro-5-phenyl-1,3-dihydro-3-hydroxy-2H-1,4-benzodiazepin-2-ones and its derivatives are well known in the art, and the method of preparation is described in U.S. Pat. 3,445,458. The other starting materials are also well known in the art. The following examples are given as representatives. 1-menthoxyacetyl chloride may be prepared as described in Org. Syn. Coll. vol. II, page 547. Optically pure α-methylbenzylisocyanate may be prepared as described by T. L. Cairns in J. Am. Chem., 63, 871 (1941). O-methylmandelyl chloride may be prepared as described by J. Jacobus, M. Raban and K. Mislow, J. Org. Chem. 33, 1142 (1968). The purification of diastereo mixtures by silica gel dry column chromatography is described by B. Loev and M. M. Goodman in Chem. Ind. (London) 2026 (1967).

As is shown in Equation 1 a 7-substituted-5-phenyl-1,3-dihydro-3-hydroxy-2H-1,4-benzodiazepin-2-one dissolved in a suitable organic solvent, such as anhydrous tetrahydrofuran, may have a substituted acetyl chloride added, and the mixture stirred at 10 to 80° C. for 0.5 to 6 hours, preferably at room temperature for about 3 hours. The product may be recovered by filtering off the solids present and flash evaporating the filtrate which may then be crystallized by dissolving in a suitable organic solvent such as dichloromethane-cyclohexane mixture. The crystalline product obtained on cooling may be chromatographed on silica gel to produce the refined product.

As is shown in Equation 2 a 7-substituted-5-phenyl-1,3-dihydro - 3 - hydroxy - 2H - 1,4-benzodiazepin-2-one dissolved in a suitable solvent and an optical pure substituted isocyanate dissolved in a suitable solvent, such as anhydrous dimethylsulfoxide, may be reacted by stirring at 10 to 80° C. for 6 to 36 hours, preferably at room temperature for about 18 hours. The product may be recovered by pouring the reaction mixture into water containing sodium chloride, filtering, dissolving in a suitable organic solvent, such as chloroform, drying, and flash evaporating to produce a foam. The pure product may be recovered by chromatographing the foam on silica gel.

The diastereomeric reaction mixtures produced by the procedures of Equations 1 and 2 and represented by Formula I, may be separated by carefully chromatographing the mixture on an appropriate column containing an inert solid support such as silica gel or alumina gel or the like, and eluting the column with an inert solvent or mixture of inert solvents such as pentane, ether, acetone, benzene, and the like. The individual diastereomers or diastereomer-enriched mixtures may be obtained upon evaporation of the eluted solution.

The compounds of this invention exhibit significant central nervous system depressant effects, muscle relaxant and antianxiety properties in standard pharmacologic tests.

In the pharmacological evaluation of the biological activity of the compound of this invention, the in vivo effects are tested as follows. The compound is administered intraperitoneally to three mice (14 to 24 grams) at each of the following doses: 400, 127, 40, 12.7, 4, 1.270, 0.4, 0.127, 0.04 and 0.0127 milligrams per kilogram of host body weight (m.p.k). The animals are watched for a minimum of two hours during which time signs of general stimulation, i.e., increased spontaneous motor activity, hyperactivity on tactile stimulation, twitching, general depression (i.e., decreased spontaneous motor activity, decreased respiration) autonomic activity (i.e., miosis, mydriasis, diarrhea) are noted.

When evaluated in the foregoing procedure the compounds of the present invention showed decreased motor activity and decreased respiration at a dose of 0.0127 to 4.00 milligrams per kilogram of host body weight where the highest non-lethal dose tested was 400 milligrams per kilogram of host body weight.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions or they may be injected parenterally, that is, intramuscularly, intravenously or subcutaneously. For parenteral administration they may be used in the form of a sterile solution containing other solutes, for example, enough saline or glucose to make the solution isotonic.

The dosage of the present pharmacological agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order to more clearly disclose the nature of the present invention, specific examples of the practice of the invention are hereinafter given. It should be understood, however, that this is done solely by way of example and is intended neither to delineate the scope of the invention nor to limit the ambit of the appended claims. In the examples all temperatures are given in degrees centigrade and the following abbreviations are used: "g." for grams, "mole" for gram molecular weight, "ml." for milliliters, and "φ" for phenyl.

EXAMPLE 1

The following illustrates the preparation of 7-chloro-5-(o-chlorophenyl)-1,3-dihydro-3-hydroxy-2H-1,4-benzodiazepin-2-one, (p-menth-3-yloxy)acetate.

To a solution of 7-chloro-5-(o-chlorophenyl)-1,3-dihydro - 3-hydroxy-2H-1,4-benzodiazepin-2-one 3.1 g. (0.01 mole) and 4-dimethylaminopyridine 1.5 g. (0.0123 mole) in 100 ml. of anhydrous tetrahydrofuran was added 1-menthoxyacetyl chloride 2.33 g. (0.01 mole). A heavy precipitate formed and the mixture was stirred at room temperature for 3 hours. The solid was filtered off and the filtrate was flash evaporated to give a yellow foam which was chromatographed on 300 g. of silica gel, packed and eluted with 1:1 ether-pentane. A total of fifteen 400 ml. fractions was collected. The desired product was obtaied from fractions 5–13. The maximum optical rotation obtained was that of fraction 5, $$[\alpha]_{436}^{25} -114.1°$$

(c. 7.46, chloroform). The rotation of the subsequent fractions decreased to a minimum of $$[\alpha]_{436}^{25} -42.5°$$

(c. 5.46, chloroform) for fraction 8. The total amount of collected material weighed 2 g. (25.8 percent yield). The solid obtained from fraction 5 did not melt but decomposed above 100°, and had a nuclear magnetic resonance spectrum in DCCl$_3$ of p.p.m. ($\delta$) 0.6–3.5 (m., 19), 4.57 (s., 2), 6.24 (s., 1), 7.25 (d., 1), 7.4–8 (m. 6).

Based on the assumed molecular formula $$C_{27}H_{30}Cl_2N_2O_4$$

it was calculated that the elemental analysis by weight would be 62.67 percent carbon, 5.84 percent hydrogen and 5.42 percent nitrogen. The product was analyzed and found to contain 62.54 percent carbon, 5.97 percent hydrogen, and 5.23 percent nitrogen which confirmed the accuracy of the assumed formula. This may be expressed:

*Analysis.*—Calcd. for $C_{27}H_{30}Cl_2N_2O_4$ (percent): C, 62.67; H, 5.84; N, 5.42. Found (percent): C, 62.54; H, 5.97; N, 5.23.

When tested in the foregoing pharmacological evaluation, the latter compound caused decreased motor activity and decreased respiration at a dose of 0.0127 m.p.k. administered orally.

EXAMPLES 1A–1J

By substitution of the appropriate starting materials into the procedure of Example 1 the following products may be obtained

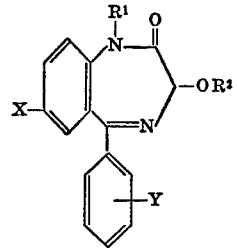

| Example | X | Y | R$^1$ | R$^2$ |
|---|---|---|---|---|
| 1 | Cl | o-Cl | H | CH(CH$_3$)$_2$ |
| | | | | ⌬-OCH$_2$CO— (with CH$_3$) |
| 1A | Cl | o-F | H | ⌬-OCH$_2$CO— |
| 1B | Cl | H | CH$_3$ | Same as above. |
| 1C | Br | o-NO$_2$ | C$_6$H$_5$CH$_2$ | ⌬-OCHCO— (with CH$_3$) |
| 1D | CF$_3$ | p-CF$_3$ | CH$_2$CH$_2$OCH$_3$ | ⌬-O—CHCO— (with C$_2$H$_5$) |
| 1E | CN | p-Br | C$_2$H$_5$ | ⌬-OCHCO— (with C$_4$H$_9$) |
| 1F | SCH$_3$ | m-SCH$_3$ | C$_6$H$_5$CH$_2$CH$_2$ | ⌬-OCHCO— (with C$_3$H$_7$) |
| 1G | NO$_2$ | o-Cl | H | ⌬-OCH$_2$CO— |
| 1H | Cl | H | C$_{10}$H$_{21}$ | Same as above. |
| 1I | CN | p-Cl | C$_6$H$_5$C$_{10}$H$_{21}$ | Do. |
| 1J | CF$_3$ | p-SCH$_3$ | C$_{10}$H$_{20}$OC$_{10}$H$_{21}$ | Do. |

EXAMPLE 2

The following illustrates the preparation of 7-chloro-5-(o-chlorophenyl) - 1,3 - dihydro - 3 - hydroxy-2H-1,4-benzodiazepin-2-one, mandelate, acetate.

To a solution of 7-chloro-5-(o-chlorophenyl)-1,3-dihydro - 3 - hydroxy-2H-1,4-benzodiazepin-2-one, 6.42 g. (0.02 mole) and 4-dimethylaminopyridine 3.5 g. (0.029 mole) in 100 ml. of anhydrous tetrahydrofuran was added acetyl mandeloyl chloride 4.25 g. (0.02 mole). The mixture obtained was stirred at room temperature for three hours. The solid present was filtered off and the filtrate was flash evaporated to give a foam, which was crystallized by dissolving it in 25 ml. of dichloromethane to which 100 ml. of cyclohexane was added. The dichloromethane was boiled off, and a crystalline product 4.8 g. (48 percent yield) was obtained upon cooling which had a broad melting point above 200°. Thin layer chromatography on silica gel using 8:2 ether-pentane indicated that the product consisted of a 1:1 mixture of diastereomers. The product had a nuclear magnetic resonance spectrum in DCCl$_3$ of p.p.m. ($\delta$) 2.20 (s., 3) 6.10 (s., 0.5), 6.12 (s., 0.5), 6.35 (s., 1), 7.04–7.20 (m., 1) 7.25–8 (m., 11).

*Analysis.*—Calcd. for $C_{25}H_{18}Cl_2N_2O_5$ (percent): C, 60.37; H, 3.65; N, 5.63. Found (percent): C, 60.29; H, 3.74; N, 5.47.

Upon chromatography of 1 g. of the diastereomeric mixture on 75 g. of silica gel packed and eluted with 1:1 ether-pentane one of the racemic diastereomers was isolated as indicated by a single spot on a thin layer chromatogram. The obtained product had a melting point of 210–211°, and a nuclear magnetic resonance spectrum in DCCl$_3$ of p.p.m. ($\delta$) 2.20 (s., 3), 6.09 (s., 1), 6.30 (s., 1), 6.5–7.9 (m., 12).

*Analysis.*—Calcd. for $C_{25}H_{18}Cl_2N_2O_5$ (percent): C, 60.37; H, 3.65; N, 5.63. Found (percent): C, 60.58; H, 3.81; N, 5.52.

When tested in the foregoing pharmacological evaluation, the latter compound caused decreased motor activity and decreased respiration at a dose of 4.0 m.p.k. administered orally.

EXAMPLE 2A–2J

In like manner, by substitution of the appropriate starting materials into the procedure of Example 2 the following products may be obtained

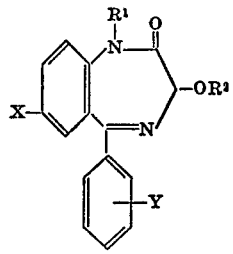

| Example | X | Y | R¹ | R² |
|---|---|---|---|---|
| 2 | Cl | o-Cl | H | ![phenyl-CH(OCOCH₃)-C(O)-] |
| 2A | Cl | H | H | Same as above. |
| 2B | Cl | o-F | CH₃ | ![phenyl-CH(OCOCH₂CH₃)-C(O)-] |
| 2C | Br | o-NO₂ | Φ—CH₂ | ![phenyl-CH(O-COCH₃)-C(O)-] |
| 2D | CF₃ | p-CF₃ | CH₃—O—CH₂CH₂ | ![phenyl-CH(O-COCH₂CH₃)-C(O)-] |
| 2E | CN | p-Br | C₃H₅ | ![phenyl-CH(O-CH₃)-C(O)-] |
| 2F | SCH₃ | m-SCH₃ | C₆H₅CH₂CH₂ | ![phenyl-CH(O-COCH₃)-C(O)-] |

TABLE—Continued

| Example | X | Y | R¹ | R² |
|---|---|---|---|---|
| 2G | $NO_2$ | o-Cl | H | ![phenyl-CH(OCOC₃H₇)-CO-] |
| 2H | Cl | H | $C_{10}H_{21}$ | ![phenyl-CH(OCCH₃)-CO-] |
| 2I | CN | p-Cl | $C_6H_5C_{10}H_{21}$ | Same as above. |
| 2J | $CF_3$ | p-S$CH_3$ | $C_{10}H_{20}OC_{10}H_{21}$ | Do. |

EXAMPLE 3

The following illustrates the preparation of 7-chloro-5-(o-chlorophenyl)-1,3-dihydro-3-hydroxy-2H-1,4-benzodiazepin-2-one, α-methylbenzylcarbamate.

A solution of 7-chloro-5-(o-chlorophenyl)-1,3-dihydro-3-hydroxy-2H-1,4-benzodiazepin-2-one, 6.4 g. (0.02 mole), optically pure α-methylbenzylisocyanate 3 g. (0.02 mole) and 1,4-diazabicyclo[2,2,2]octane, 2.3 g. (0.02 mole) in 75 ml. of anhydrous dimethyl sulfoxide was stirred at room temperature for 18 hours. Upon pouring the solution into water containing some sodium chloride a light yellow solid was obtained, which was filtered, dissolved in chloroform, dried and flash evaporated, to give a yellow foam. The foam (3 g.) was chromatographed on silica gel (400 g.) packed and eluted with 1:1 ether-pentane. The desired optically pure product was obtained from fractions 45–68 (400 ml. eluent in each fraction) and was recrystallized from ether. The product had a melting point of 193–196°, an optical rotation of $$[\alpha]_{436}^{23} +209.8°$$

(c. 5.1, tetrahydrofuran), and a nuclear magnetic resonance spectrum in (DMSO-$D_6$) of p.p.m. ($\delta$) 1.45 (d., 3), 4.95 (m., 1), 6.07 (s., 1), 7–7.8 (m., 12).

*Analysis.*—Calcd. for $C_{24}H_{19}Cl_2N_2O_2$ (percent): C, 61.55; H, 4.09; N, 8.97. Found (percent): C, 61.26; H, 4.08; N, 8.67.

EXAMPLES 3A–3J

In like manner, by substitution of the appropriate starting materials in the procedure of Example 3 the following may be obtained.

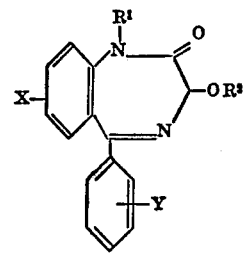

| Example | X | Y | R¹ | R² |
|---|---|---|---|---|
| 3 | Cl | o-Cl | H | ![phenyl-CH(CH₃)-NH-C(O)-] |
| 3A | Cl | o-F | H | Same as above. |
| 3B | Cl | H | $CH_3$ | ![phenyl-CH(CH₂-CH₃)-NH-C(O)-] |
| 3C | Br | o-$NO_2$ | $C_6H_5$-$CH_3$ | ![naphthyl-CH(CH₃)-NH-C(O)-] |
| 3D | $CF_3$ | p-$CF_3$ | $CH_3CH_2OCH_3$ | Same as above. |
| 3E | CN | p-Br | $C_2H_5$ | ![phenyl-CH(CH₃)-NH-C(O)-] |

TABLE—Continued

| Example | X | Y | R¹ | R² |
|---------|-----|--------|----------------|-----|
| 3F | SCH₃ | m-SCH₃ | C₆H₅—CH₂CH₂ | ![naphthyl-CH(CH₃)-NH-C(=O)-] |
| 3G | NO₂ | o-Cl | H | ![phenyl-CH(CH₃)-NH-C(=O)-] |
| 3H | Cl | H | C₁₀H₂₁ | Same as above. |
| 3I | CN | p-Cl | C₆H₅C₁₀H₂₁ | Do. |
| 3J | CF₃ | p-SCH₃ | C₁₀H₂₀OC₁₀H₂₁ | Do. |

EXAMPLE 4

The following illustrates the preparation of 7-chloro-5-(o-chlorophenyl) - 1,3 - dihydro - 3 - hydroxy-2H-1,4-benzodiazepin-2-one, methoxyphenylacetate.

To a solution of 7-chloro-5-(o-chlorophenyl)-1,3-dihydro-3-hydroxy-2H-1,4-benzodiazepin-2-one, 9.6 g. (0.03 mole) and 4-dimethylaminopyridine 5 g. (0.041 mole) in 150 ml. of anhydrous tetrahydrofuran was added optically pure o-methylmandelyl chloride 5 g. (0.03 mole). A heavy precipitate formed, and the mixture was stirred at room temperature for 3 hours. The precipitate was filtered off, and the filtrate was flash evaporated to give a yellow foam, which by thin layer chromatography (silica gel eluted with 8.5:1.5 ether-pentane) indicated a 1:1 ratio of two distinctly separated diastereomers. The pure diastereomeric mixture was purified by silica gel dry column chromatography to give 2 g. of white solid, which was recrystallized from ether at low temperature. The solid decomposed above 116°, and had a nuclear magnetic resonance spectrum in DCCl₃ of p.p.m. (δ) 3.52 (s., 3), 5.11 (s., 1), 6.02 (s., 0.5), 6.07 (s., 0.5), 6.9–7.8 (m., 12).

*Analysis.*—Calcd. for C₂₄H₁₈Cl₂N₂O₄ (percent): C, 61.42; H, 3.87; N, 5.97. Found (percent): C, 61.69; H, 4.05; N, 5.66.

Upon chromatography of 1 g. of the diastereomeric mixture on 200 g. of silica gel which was packed and eluted with 1:1 ether-pentane, one of the diastereomers was isolated. The second slower moving diastereomer appeared to be contaminated with hydrolyzed product and could not be purified without decomposition. The optically pure diastereomer had a melting point of 163–163.5°, an optical activity of $$[\alpha]^{23}_{436} -82.43°$$

(c. 0.74, acetone), and a nuclear magnetic resonance spectrum in (DCCl₃) of p.p.m. (δ) 3.52 (s., 3), 5.11 (s., 1), 6.07 (s., 1), 6.9–7.8 (m., 12).

*Analysis.*—Calcd. for C₂₄H₁₈Cl₂N₂O₄ (percent): C, 61.42; H, 3.87; N, 5.97. Found (percent): C, 61.16; H, 3.95; N, 5.73.

EXAMPLES 4A–4J

Following the procedure of Example 4, but substituting appropriate starting materials products having the following structural formula may be prepared:

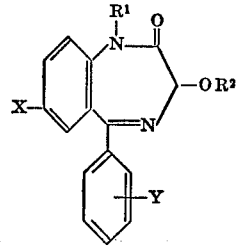

| Example | X | Y | R¹ | R² |
|---------|-----|------|----------------|-----|
| 4 | Cl | o-Cl | H | phenyl-CH(OCH₃)-C(=O)- |
| 4A | Cl | o-F | H | Same as above. |
| 4B | Cl | H | CH₃ | phenyl-CH(OC₂H₅)-C(=O)- |
| 4C | Br | o-NO₂ | C₆H₅CH₂ | phenyl-CH(OCH₃)-C(=O)- |
| 4D | CF₃ | p-CF₃ | CH₂OCH₂CH₃ | phenyl-CH(OCH(CH₃)CH₃)-C(=O)- |

TABLE—Continued

| Example | X | Y | R¹ | R² |
|---|---|---|---|---|
| 4E | CN | p-Br | $C_2H_5$ | phenyl-CH(OCH$_3$)-C(O)- |
| 4F | SCH$_3$ | m-SCH$_3$ | $C_6H_5CH_2CH_3$ | phenyl-CH(OCH$_2$CH$_3$)-C(O)- |
| 4G | NO$_2$ | o-Cl | H | phenyl-CH(OC$_4$H$_9$)-CO- |
| 4H | Cl | H | $C_{10}H_{21}$ | phenyl-C(OCH$_3$)-C(O)- |
| 4I | CN | p-Cl | $C_6H_5C_{10}H_{21}$ | Same as above. |
| 4J | CF$_3$ | p-SCH$_3$ | $C_{10}H_{20}OC_{10}H_{21}$ | Do. |

What is claimed is:

1. A compound having the formula:

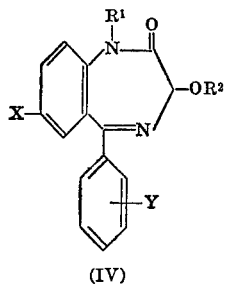

(IV)

wherein X is selected from the group consisting of halogen, trifluoromethyl, nitro, cyano and lower alkyl thio; Y is selected from the group consisting of hydrogen, halogen, trifluoromethyl, nitro, cyano and lower alkyl thio; R¹ is hydrogen, lower alkyl, phenyl(lower)alkyl or lower alkoxy(lower)alkyl; R² is selected from the group of optically active radicals which contain a minimum of one asymmetric center consisting of α-methylbenzylcarbamoyl, (p-menth-3-yloxy)acetyl, O-methyllactyl, O-methylmandelyl, O-acetyllactyl, O-acetylmandelyl; with the proviso that the lower alkyl and lower alkoxy groups contain from one to ten carbon atoms.

2. A compound as defined in claim 1 which is 7-chloro-5-(o-chlorophenyl) - 1,3 - dihydro-3-hydroxy-2H-1,4-benzodiazepin-2-one (p-meth-3-yloxy)acetate.

3. A compound as defined in claim 1 which is 7-chloro-5-(o-chlorophenyl) - 1,3 - dihydro - 3 - hydroxy-2H-1,4-benzodiazepin-2-one, mandelate, acetate.

4. A compound as defined in claim 1 which is 7-chloro-5-(o-chlorophenyl) - 1,3 - dihydro - 3 - hydroxy-2H-1,4-benzodiazepin-2-one, α-methylbenzylcarbamate.

5. A compound as defined in claim 1 which is 7-chloro-5-(o-chlorophenyl) - 1,3 - dihydro - 3 - hydroxy-2H-1,4-benzodiazepin-2-one, O-methyl mandelate.

References Cited

UNITED STATES PATENTS

| 3,321,469 | 5/1967 | Walkenstein | 260—239.3 D |
| 3,445,458 | 5/1969 | Bell | 260—239.3 D |
| 3,514,445 | 5/1970 | Bell | 260—239.3 D |
| 3,654,267 | 4/1972 | Jommi et al. | 260—239.3 D |

JOHN D. RANDOLPH, Primary Examiner

R. T. BOND, Assistant Examiner

U.S. Cl. X.R.

424—244